F. ROSDORFF.
PROTECTIVE COVER FOR PNEUMATIC TUBES.
APPLICATION FILED DEC. 3, 1910.
996,796.
Patented July 4, 1911.
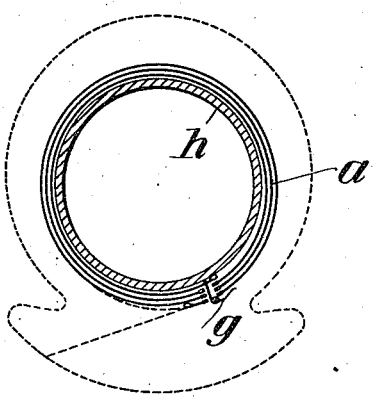
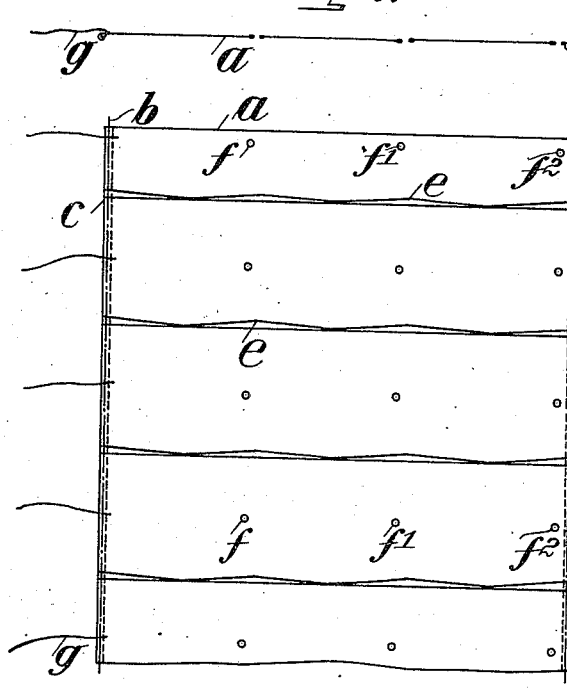
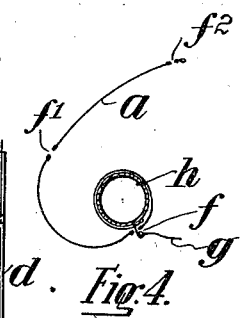
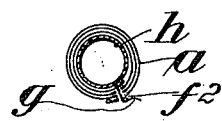

UNITED STATES PATENT OFFICE.

FRITZ ROSDORFF, OF POTSDAM, GERMANY.

PROTECTIVE COVER FOR PNEUMATIC TUBES.

996,796. Specification of Letters Patent. Patented July 4, 1911.

Application filed December 3, 1910. Serial No. 595,472.

*To all whom it may concern:*

Be it known that I, FRITZ ROSDORFF, a subject of the German Emperor, and resident of Potsdam, Germany, have invented new and useful Improvements in Protective Covers for Pneumatic Tubes, of which the following is a specification.

This invention relates to a protective cover for the inner tube adapted for use with an automobile wheel tire and is intended to fill the space between such tube and the outer shoe, for the purpose of protecting it against movements and strains during travel and thereby increasing its durability.

Protective covers which partially surround the inner tube are known. These covers do not effect their purpose because they share the motions of the tube or of the outer shoe and become displaced under the action of the friction occurring during motion in the interior of the wheel tire and consequently twist and stretch and thus act injuriously upon the tube.

The object of the present invention is a protective cover composed of a piece of material with reinforced edges forming when in place a closed ring and surrounding the inner tube several times, preferably three times. In this cover the tube is inclosed in such a manner that firstly the first third of the width of the protective envelop, then the second third, and finally the third third respectively surround it. In order, however, to render possible the infolding and multiple enveloping of the air tube, in accordance with the present invention, there are attached to the inner edge of the protective envelop, a number of cords which render it possible to bind the air tube fast to the protective envelop sectionally according to the extent of its envelopment, and thus to pack it in quite smoothly. Such a protective envelop containing the tube inclosed on all sides forms a very resistant tube, which moreover in the event of the edge of the outer shoe springing out of its position in the wheel rim at a single point prevents the air tube from being squeezed out sidewise at this point and injured.

The invention is illustrated in the drawing as follows:

Figure 1 shows a vertical section through the pneumatic tire. Fig. 2 a transverse section and Fig. 3 a plan view of a portion of the extended protective envelop on a smaller scale. Figs. 4 to 6 show transverse sections of the inner tube in combination with the protective envelop at various periods of its application.

The protective envelop $a$ formed of canvas, linen or the like has edges $c$, $d$ reinforced by cords $b$ which are secured thereto in any suitable manner. The inner edge $c$ is narrower than the outer edge $d$. The required smoothness is effected by means of suitable plaits $e$. The envelop is provided in the example shown with three rows of equi-spaced eyelets $f$, $f'$, $f^2$. The first row is spaced from the inner edge a distance equal substantially to $\frac{1}{3}$ the width of the envelop; the second row is spaced from the inner edge a distance substantially equal to $\frac{2}{3}$ the width of the envalop; and the third row is positioned adjacent the outer edge. To the inner edge of the envelop are secured a number of fastening cords $g$. The inner tube $h$ is placed on the protective envelop and the latter is wrapped around so that the first third of its width surrounds the tube as shown in Fig. 4 and the envelop is temporarily secured in position by drawing the cords $g$ through the corresponding holes $f$ and knotting them. After this has been done, the second third of the width of the envelop is wrapped around the already enveloped tube as shown in Fig. 5 and the cords which were knotted at $f$ are released, drawn through the holes $f'$ and again knotted. After the tube has thus been completely enveloped with the second third of the protective envelop, the same process is repeated with the last third of the protective envelop, the fastening cords being released from the eyelets $f^1$, drawn through the eyelets $f^2$ and again knotted (Fig. 6). The enveloped air tube is then placed in position upon the wheel and within the outer shoe and pumped up in the usual manner.

Having now particularly described and ascertained the nature of my said invention and in what manner the same is to be performed, I declare that what I claim is:

A protective envelop for the inner tube of vehicle tires comprising a sheet of fabric adapted to be wound around the tube, said sheet being of such a width that it will completely surround the enveloped tube a plurality of times, said sheet being provided with a plurality of rows of eyelets and a row of fastening cords, said rows being substantially parallel to one another, each row being spaced from the row next adjacent thereto a distance substantially equal to the circumference of the entire tube when enveloped.

In testimony whereof I have signed my name to this specification in the presence of two subscribing witnesses.

FRITZ ROSDORFF.

Witnesses:
 HENRY HASPER,
 WOLDEMAR HAUPT.

Copies of this patent may be obtained for five cents each, by addressing the "Commissioner of Patents, Washington, D. C."